United States Patent
Becker et al.

(10) Patent No.: US 10,083,353 B2
(45) Date of Patent: Sep. 25, 2018

(54) IDENTIFYING DOCUMENT FORMS USING DIGITAL FINGERPRINTS

(71) Applicant: INTUIT INC., Mountain View, CA (US)

(72) Inventors: Richard J. Becker, Mountain View, CA (US); Greg Knoblauch, Edmonton (CA); Pavlo Malynin, Alberta (CA); Anju Eappen, Alberta (CA)

(73) Assignee: Intuit Inc., Mountain View, CA (US)

( * ) Notice: Subject to any disclaimer, the term of this patent is extended or adjusted under 35 U.S.C. 154(b) by 146 days.

(21) Appl. No.: 15/337,395

(22) Filed: Oct. 28, 2016

(65) Prior Publication Data

US 2018/0121720 A1    May 3, 2018

(51) Int. Cl.
| | |
|---|---|
| G06K 9/00 | (2006.01) |
| G06T 1/00 | (2006.01) |
| H04N 1/32 | (2006.01) |
| G06T 7/11 | (2017.01) |

(52) U.S. Cl.
CPC ..... *G06K 9/00449* (2013.01); *G06K 9/00463* (2013.01); *G06K 9/00483* (2013.01); *G06T 1/0021* (2013.01); *H04N 1/32203* (2013.01); *H04N 1/32267* (2013.01); *H04N 1/32309* (2013.01); *H04N 1/32336* (2013.01); *G06T 7/11* (2017.01)

(58) Field of Classification Search
CPC .......... G06K 9/00463; G06K 9/00449; G06K 9/00483; G06K 9/52; G06K 9/00442; G06K 9/3233; G06K 9/3241; G06K 9/3258; G06F 17/2247; G06F 17/243; G06F 17/211; G06F 17/248; G06F 17/30864; G06T 7/11; H04N 1/00331
See application file for complete search history.

(56) References Cited

U.S. PATENT DOCUMENTS

| | | | |
|---|---|---|---|
| 5,048,099 A | 9/1991 | Lee | |
| 6,005,680 A * | 12/1999 | Luther | ............... H04N 1/40062 358/2.1 |
| 6,741,738 B2 | 5/2004 | Taylor | |
| 6,952,484 B1 | 10/2005 | Higginbottom et al. | |
| 6,990,233 B2 * | 1/2006 | Park | ..................... G06K 9/3241 382/164 |

(Continued)

OTHER PUBLICATIONS

Wong et al., "Document Analysis System", IBM Journal of Research and Development; vol. 26, Iss. 6; 647-656, 1982.

(Continued)

*Primary Examiner* — Michael Osinski
(74) *Attorney, Agent, or Firm* — Patterson + Sheridan LLP

(57) ABSTRACT

Techniques are disclosed to identify a form document in an image using a digital fingerprint of the form document. To do so, the image is evaluated to detect features of the image and generate a boundary around each feature. For each boundary, dimensions of the boundary may be stored in a color channel of a pixel in a second image. Thus, the color of the pixel represents the size of the boundary. The second image is the digital fingerprint of the form. To identify the form corresponding to the digital fingerprint, the digital fingerprint may be compared to digital fingerprints of known forms.

20 Claims, 6 Drawing Sheets
(1 of 6 Drawing Sheet(s) Filed in Color)

(56) References Cited

U.S. PATENT DOCUMENTS

| | | | |
|---|---|---|---|
| 7,386,789 B2* | 6/2008 | Chao | G06F 17/24 707/999.003 |
| 7,552,120 B2* | 6/2009 | Essafi | G06F 17/3002 |
| 7,650,041 B2 | 1/2010 | Madej et al. | |
| 7,707,157 B1* | 4/2010 | Shen | G06F 17/2211 707/999.102 |
| 7,730,316 B1* | 6/2010 | Baccash | G06F 21/64 382/225 |
| 7,961,905 B2 | 6/2011 | Harrington | |
| 8,086,039 B2 | 12/2011 | Kletter | |
| 8,520,888 B2* | 8/2013 | Spitzig | G06K 9/00577 356/71 |
| 8,660,294 B2* | 2/2014 | Comay | G06F 17/243 382/100 |
| 8,774,455 B2 | 7/2014 | Elmenhurst et al. | |
| 8,838,657 B1 | 9/2014 | Malone et al. | |
| 9,153,005 B2 | 10/2015 | Tremolada et al. | |
| 9,372,867 B2* | 6/2016 | Huang | G06F 17/30156 |
| 9,430,583 B1* | 8/2016 | Flake | G06F 17/3092 |
| 9,773,058 B2* | 9/2017 | Wang | G06F 17/30778 |
| 2005/0193327 A1* | 9/2005 | Chao | G06F 17/24 715/256 |
| 2006/0294460 A1* | 12/2006 | Chao | G06F 17/211 715/209 |
| 2007/0271224 A1* | 11/2007 | Essafi | G06F 17/3002 |
| 2008/0187241 A1* | 8/2008 | Talati | G06K 9/00134 382/282 |
| 2009/0232405 A1* | 9/2009 | Taguchi | G06K 9/6206 382/218 |
| 2010/0027834 A1* | 2/2010 | Spitzig | G06K 9/00577 382/100 |
| 2010/0053682 A1* | 3/2010 | Gotoh | H04N 1/00411 358/1.15 |
| 2010/0153834 A1* | 6/2010 | Abe | G06F 17/243 715/222 |
| 2010/0254615 A1* | 10/2010 | Kantor | G06K 9/6201 382/218 |
| 2011/0194736 A1* | 8/2011 | Kletter | G06F 17/30011 382/112 |
| 2011/0218021 A1* | 9/2011 | Anderson | A63F 9/24 463/2 |
| 2012/0054595 A1* | 3/2012 | Mylroie | G06F 21/10 715/234 |
| 2012/0093421 A1* | 4/2012 | Kletter | G06K 9/00463 382/209 |
| 2013/0290828 A1* | 10/2013 | Flake | G06F 17/30047 715/234 |
| 2014/0033016 A1* | 1/2014 | Perelman | G06F 17/243 715/234 |
| 2016/0026899 A1* | 1/2016 | Wang | G06T 7/11 382/176 |
| 2016/0283818 A1* | 9/2016 | Liu | G06K 9/4652 |
| 2016/0292294 A1* | 10/2016 | Flake | G06F 17/3092 |
| 2017/0053164 A1* | 2/2017 | Eagleton | G06K 9/00456 |
| 2017/0357869 A1* | 12/2017 | Shustorovich | G06K 9/186 |
| 2018/0033147 A1* | 2/2018 | Becker | G06T 7/0081 |
| 2018/0046605 A1* | 2/2018 | Hickey | G06F 3/04883 |
| 2018/0052843 A1* | 2/2018 | Flake | G06F 17/30864 |
| 2018/0077313 A1* | 3/2018 | Eagleton | H04N 1/32272 |
| 2018/0114337 A1* | 4/2018 | Li | G06T 7/73 |
| 2018/0117945 A1* | 5/2018 | Talwerdi | B42D 25/305 |

OTHER PUBLICATIONS

International Search Report and Written Opinion dated Jan. 23, 2017 for Application No. PCT/US2016/061903.

* cited by examiner

IDENTIFYING DOCUMENT FORMS USING DIGITAL FINGERPRINTS

BACKGROUND

Field

Embodiments presented herein generally relate to techniques for identifying a form document. More specifically, embodiments presented herein provide techniques for identifying a form depicted in an image based on a digital fingerprint of the form.

Description of the Related Art

Data related to financial transactions is essential for a variety of business and personal transactions. For example, a small business owner may use accounting data to generate reports regarding customer invoices or cash flow. The data needed for such reports may be located within a document such as word-processing documents, spreadsheets, or Portable Document Format (PDF) documents and paper documents (e.g., which may be generated electronically). Thus, the data must be extracted for the small business owner to generate a report. Similarly, an individual who uses a commercially available tax preparation software may need to extract data from various tax documents (e.g., W-2, 1099, 1098-T, etc.) needed to file their tax return. The tax documents may be provided to the individual by an employer or bank.

To extract data from a document, a computing device may perform optical character recognition (OCR) using a digital image of the document to convert text content shown in the image into machine-readable text. However, variations in the layouts of documents may contribute to poor results in reading text from the documents. For example, an individual may receive documents from numerous businesses. The received documents may be instances of the same general form type, such as tax documents. While the documents may include similar data, the location of data may vary between documents from different sources. This variation may make it difficult for an OCR application to extract data used by other applications (e.g., a tax preparation application). In such a case, a user may have to manually enter data into such applications.

SUMMARY

One embodiment presented herein includes a computer-implemented method for generating a digital fingerprint corresponding to a form depicted in a digital image. The method may generally include identifying one or more features of a form depicted in a first digital image. The method may also include determining, for each of the one or more features, coordinates of a respective polygon bounding the feature within the first digital image. For each polygon, the method may include, identifying coordinates of a center of the polygon within the first digital image, and storing dimensions of the polygon in one or more color channels of a pixel in a second image. A position of each pixel in the second image matches a position of the center of a corresponding polygon in the first digital image. The second image comprises a digital fingerprint of the form depicted in the first digital image.

Another embodiment presented herein includes a computer-readable storage medium storing instructions, which, when executed on a processor, perform an operation to generate a digital fingerprint corresponding to a form depicted in a digital image. The operation may generally include identifying one or more features of a form depicted in a first digital image. The operation may also include determining, for each of the one or more features, coordinates of a respective polygon bounding the feature within the first digital image. For each polygon, the operation may include, identifying coordinates of a center of the polygon within the first digital image, and storing dimensions of the polygon in one or more color channels of a pixel in a second image. A location of each pixel in the second image matches a location of the center of a corresponding polygon in the first digital image. The second image comprises a digital fingerprint of the form depicted in the first digital image.

Still another embodiment presented herein includes a system having a processor and a memory hosting an application, which, when executed on the processor, performs an operation to generate a digital fingerprint corresponding to a form depicted in a digital image. The operation may generally include identifying one or more features of a form depicted in a first digital image. The operation may also include determining, for each of the one or more features, coordinates of a respective polygon bounding the feature within the first digital image. For each polygon, the operation may include, identifying coordinates of a center of the polygon within the first digital image, and storing dimensions of the polygon in one or more color channels of a pixel in a second image. A location of each pixel in the second image matches a location of the center of a corresponding polygon in the first digital image. The second image comprises a digital fingerprint of the form depicted in the first digital image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
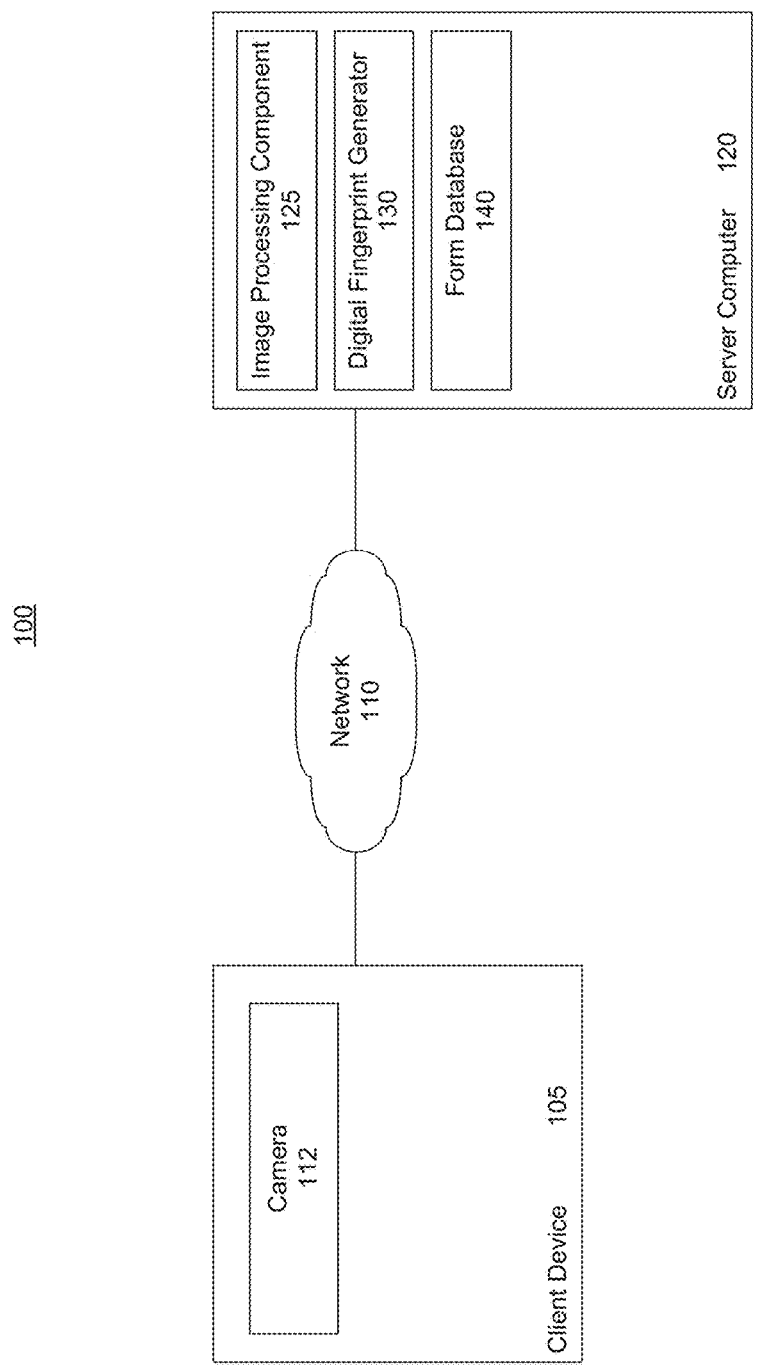
FIG. 1 illustrates an example computing environment, according to one embodiment.

Embodiments presented herein provide techniques for evaluating a document to generate a digital fingerprint of that document. More specifically, techniques presented herein provide techniques to identify a version of a form document using a digital fingerprint of the form that is based on a spatial relationship of features on the form.

In one embodiment, a digital fingerprint is generated from a digital image of the form. For example, a digital image of a form (such as a tax form) may be processed to generate a boundary around each paragraph or other feature of the form. The image is segmented into regions—referred to as segmentation—to locate paragraphs of text or groupings of pixels on the form. A boundary is formed around each group of pixels (i.e., a feature of the image). A boundary is a polygon, typically a rectangle, that represents the location and size of a feature of the image. Spatial coordinates for two diagonally opposite corners of each rectangle bounding a feature (e.g., an upper left corner and a lower right corner) are used to calculate a centroid of each boundary. A pixel representing the centroid of each boundary is plotted on a blank image.

In one embodiment, the blank image may be the same size as the original image, and each pixel in the blank image is located at the same coordinates as the centroid in the original image. Further, dimensions of each boundary may be stored in color channels of the corresponding pixel in the blank image. For example, RGB (red, green, blue) channels of each pixel may be encoded to represent a height and a width of the corresponding boundary. The R channel may represent the width of the boundary, the G channel may represent the height of the boundary, and the B channel may represent a ratio of the height to width. The resulting image with the encoded pixels represents the digital fingerprint of the form.

In one embodiment, a database may be created for a large number of digital fingerprints. Each fingerprint in the database may correspond to a different form. For example, the database may contain fingerprints for tax forms which may vary by agency or State that issued the form, or tax year. A database entry for a given form may contain the digital fingerprint of the form as well as attributes that indicate an agency or State that issued the form and a year the form was issued.

To identify a given form, a digital fingerprint of that form is generated and compared to a plurality of fingerprints stored in the database. A matching fingerprint is found when a distance measure between the fingerprint being evaluated and a given fingerprint in the database meets a predetermined distance measure threshold. The distance measure, for example, may be a Euclidean distance or Hamming distance between the two compared fingerprints.

Once a matching fingerprint is found (i.e., a matching image), the form being evaluated may be recognized as an instance of the form corresponding to the matching fingerprint. For example, if the matching fingerprint corresponds to a form that was issued by the Internal Revenue Service (IRS) for 2014, the form being evaluated may be recognized as being issued by the IRS for 2014.

The purpose of a digital fingerprint of a form is to accurately identify the form by comparing the fingerprint to other digital fingerprints of known forms. Advantageously, a digital fingerprint increases the speed and accuracy of identifying a given form document.

FIG. 1 illustrates an example computing environment 100, according to one embodiment. As shown, the computing environment 100 includes a client device 105, a network 110, and a server computer 120.

As shown, the client device 105 includes a camera 112. The camera 112 may be used by a client to capture an image of a form. Such an image generally provides a digital representation of the form, such as a JPG image or a PNG image. Alternatively, a document scanner could be used to capture a digital image of a form. Client device 105 communicates with server computer 120 over the network 110. For example, once an image of a form is captured, client device 105 may send the image to the server computer 120 over the network 110.

As shown, server computer 120 includes an image processing component 125, a digital fingerprint generator 130, and a form database 140. Prior to generating a digital fingerprint of a form in a received image, the image processing component 125 may normalize image characteristics so that the image is skew invariant, scale invariant, rotation invariant, etc. For example, the image processing component 125 may de-skew the image, remove any keystone effect from the image, normalize the resolution of the image, normalize the size of the image, perform color correction (for white balance and contrast), perform binarization, etc.

Once the image is processed, image processing component 125 may locate paragraphs of text or groups of pixels (i.e., features), create segments of each feature, and generate a polygon (i.e., a boundary) around each segment. Each boundary may be a rectangle, and digital fingerprint generator 130 may determine a height and a width of each rectangle. The image processing component 125 may also compare the generated fingerprint to fingerprints stored in form database 140.

The digital fingerprint generator 130 may use dimensions of each rectangle bounding a feature to calculate a centroid. Once a position of each centroid is determined (e.g., X,Y coordinates of a center point), digital fingerprint generator 130 may, for each centroid, change a color of a corresponding pixel in a second, blank image. A position of the corresponding pixel in the second image matches the position of the centroid. To change a color of a corresponding pixel, digital fingerprint generator 130 may encode the dimensions of a corresponding rectangle in color channels of each pixel. For example, a first color channel may store the height of the corresponding rectangle, a second color channel may store the width of the corresponding rectangle, and a third color channel may store a ratio of the height to width or the area of the rectangle.

The form database 140 may store a digital fingerprint for one or more known forms and may include attributes which characterize a form. For example, an attribute may specify an agency that created the form, a year the form was issued, a revision of the form, etc. Digital fingerprints may be generated for a large number of forms and stored in form database 140. To identify a new form document, a digital fingerprint of that form may be created and compared to the fingerprints stored in form database 140. When a matching fingerprint is found in the database, attributes of that fingerprint can be used to guide an OCR process to extract data from a specific location on the form being evaluated.

Figure 2:
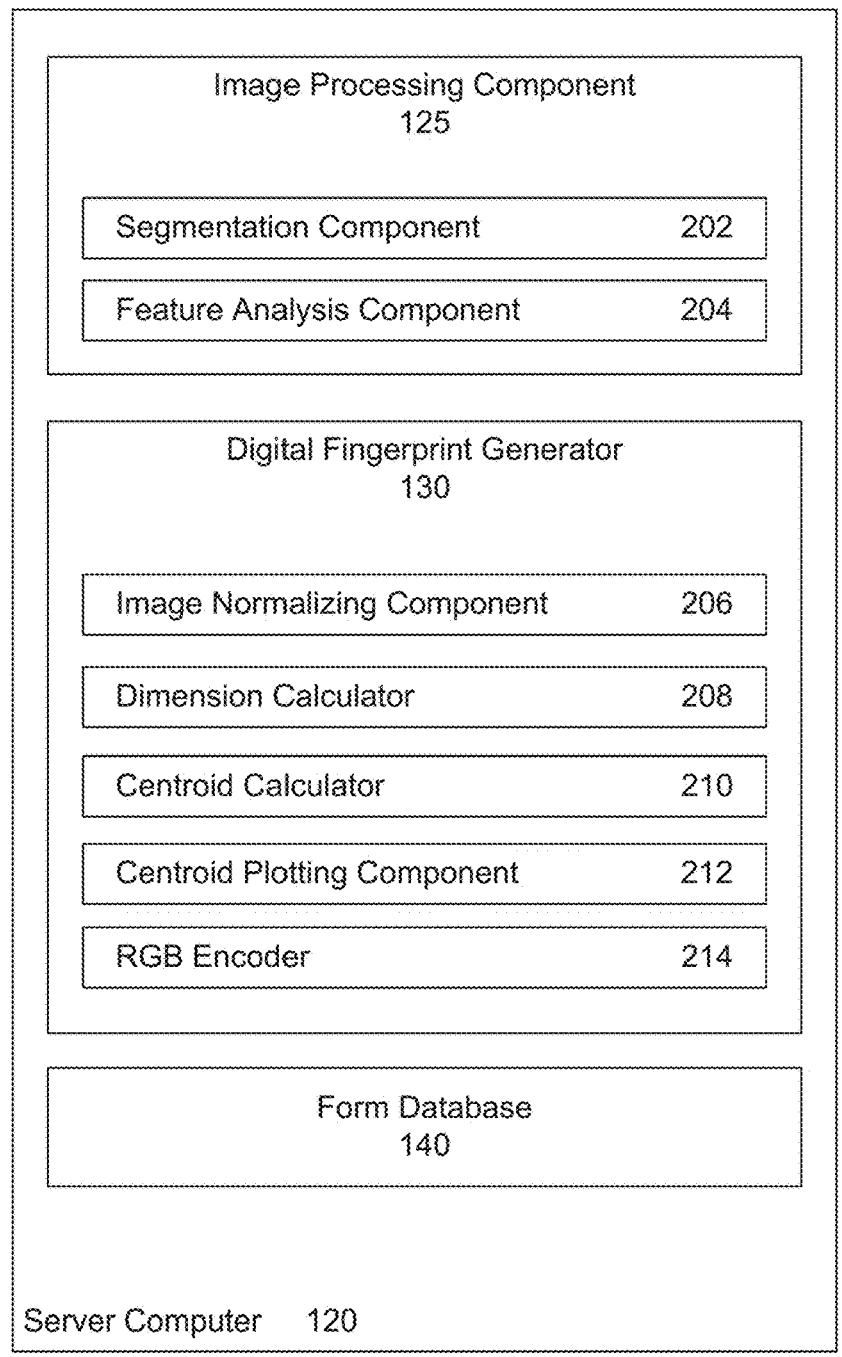
FIG. 2 illustrates an example server computer configured to identify a tax form using a digital fingerprint, according to one embodiment.

FIG. 2 illustrates an example server computer 120 configured to identify a form using a digital fingerprint, according to one embodiment. As shown, image processing component 125 includes a segmentation component 202 and a feature analysis component 204.

As shown, digital fingerprint generator 130 includes an image normalizing component 206, a dimension calculator 208, a centroid calculator 210, a centroid plotting component 212, and an RGB encoder 214. The image normalizing component 206 may reduce the size of an image of a form. For example, an image may be reduced to a predetermined resolution while the aspect ratio is maintained. The resolution is reduced to increase the speed of the segmentation process.

The segmentation component 202 may locate paragraphs of text or other features in an image of a form document, segment each feature, and generate a rectangle around each feature. For example, a rectangle may be generated around a given feature by applying a Gaussian blur to the feature and then eroding the blurred feature. Each rectangle identifies a unique feature of a layout of a form being evaluated.

In one embodiment, the image normalizing component 206 may discard a rectangle from the fingerprint generation process. A rectangle may be discarded if the rectangle does not contribute to generating a digital fingerprint that can be used to uniquely identify the form. For example, image normalizing component 206 may calculate a ratio between a height and a width of each rectangle and compare that ratio to a minimum threshold. If the ratio for a given rectangle does not meet the threshold, that rectangle may be discarded from the fingerprint generation process. A rectangle may also be removed if a dimension of the rectangle does not meet a minimum size. For example, a rectangle may be removed if it is less than 6 pixels tall by 6 pixels wide.

Once the rectangles are generated around each feature, the dimension calculator 208 may determine coordinates of each rectangle. For example, the dimension calculator 208 may determine X,Y coordinates of an upper left corner and a lower right corner of a given rectangle. The coordinates are used to determine a height and a width of each rectangle. Centroid calculator 210 may use the height and width of a given rectangle to determine a centroid of that rectangle. Each rectangle represents a location of a corresponding feature, and each centroid represents a location of a center of a corresponding rectangle.

To create a digital fingerprint of a form, the centroid plotting component 212 creates a second image that is blank and is the same size as a corresponding image of a form. The centroid plotting component 212 plots a pixel corresponding to each centroid on the second image. A position of each pixel in the second image matches a position of the corresponding centroid in the image of the form. To add to the uniqueness of the fingerprint being created, the color of each pixel may be adjusted to represent the dimensions of a corresponding rectangle. For example, the RGB encoder 214 may adjust the RGB channels of each pixel to represent the dimensions of the corresponding rectangle as described with reference to FIG. 1. The image containing the encoded pixels comprises the digital fingerprint of form being evaluated.

RGB encoder 214 may also encode a value in an alpha channel of one or more pixels in the second image. An alpha channel of an image typically represents a level of transparency by combining a background with an image. In this case, a value may be assigned to the alpha channel of one or more pixels that correspond to a level of importance for features that may not contribute to generating a fingerprint that accurately identifies the form being evaluated. Features that may not contribute to a fingerprint include a dust particle on an image of the form and a border around the form. For example, when an image of the form is segmented, a dust particle may be identified as a single letter or a period. Similarly, a border may be identified as a long blob of text. Such features do not contribute to a digital fingerprint because they may be inconsistent between two images of the same form (e.g., a dust particle) or do not represent data that would be extracted from the form (e.g., an image border). Thus, the alpha channel of a pixel corresponding to these features is encoded with a low value so the pixel is almost transparent and will be ignored when the fingerprint of the form being evaluated is compared to fingerprints in a database as discussed below.

To determine whether a value will be assigned to an alpha channel of a given pixel, a ratio of a height to a width of the corresponding rectangle is compared to a threshold. If the ratio does not satisfy the threshold, the alpha channel of the corresponding pixel may be assigned a low value. The lower the value of the alpha channel, the more transparent the corresponding pixel will be in the second image.

The feature analysis component 204 may compare a digital fingerprint of a form to be identified to digital fingerprints in form database 140. For example, feature analysis component 204 may use computer-vision feature-detection methods to detect features of a given fingerprint. Some types of features that can be detected include edges, corners, interest points, blobs, regions of interest, and ridges.

Once a matching fingerprint is found, attributes of the form being evaluated may be modified to equal attributes of a form corresponding to the matching fingerprint. For example, an attribute of the form corresponding to the matching fingerprint may indicate that the State of California issued the form in 2015. Thus, attributes of the form being evaluated may be modified to indicate that the form was issued by the State of California in 2015.

Based on the modified attributes, segmentation component 202 may extract one or more individual segments (i.e., rectangles) from the original image of the form. Data may be extracted from these segments for use by other applications.

Prior to comparing a digital fingerprint to other fingerprints in the form database 140, the image normalizing component 206 may reduce the fingerprint (i.e., the second image) to a predetermined size. For example, the image normalizing component 206 may transform the fingerprint to match the size of all fingerprints in the form database 140. As an example, the fingerprint may be reduced to 128 pixels by 128 pixels. Advantageously, reducing the size of a fingerprint decreases the time required for the comparison process and reduces the storage space needed for form database 140.

Figure 3:
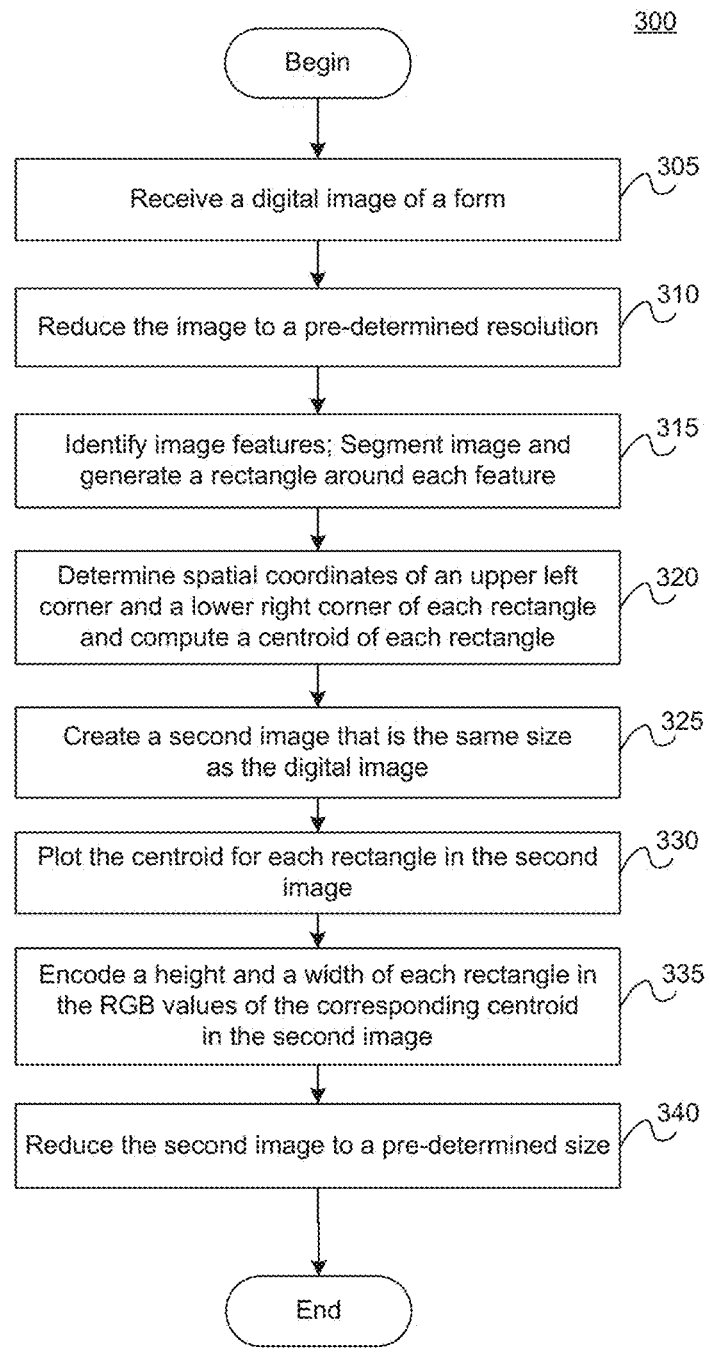
FIG. 3 illustrates a method for generating a digital fingerprint of a form, according to one embodiment.

FIG. 3 illustrates a method 300 for generating a digital fingerprint of a form, according to one embodiment. At step 305, a server computer configured to identify a form using a digital fingerprint receives a digital image of a form. For example, an individual may receive tax documents from their employer or bank. To use commercially available tax preparation software, data may need to be extracted from the documents. The individual may take a digital image of a given tax document and send the image to a digital fingerprint generator used by the tax preparation software.

At step 310, an image normalizing component reduces the resolution of the digital image, but maintains the aspect ratio. Reducing the resolution increases the speed of the segmentation process of step 315. At step 315, a segmentation component identifies features of the image, segments the image, and generates a boundary around each feature. Boundaries may be formed around each feature by blurring each feature and then eroding the blurred feature.

At step 320, a dimension calculator determines the coordinates of diagonally opposite corners (e.g., an upper left corner and a lower right corner) of each rectangle. A centroid calculator uses the coordinates to compute a centroid of each rectangle.

At step 325, a centroid plotting component creates a second image. In one embodiment, the second image is blank and the same size as the received image. At step 330, the centroid plotting component plots a pixel on the second image for each centroid. Each pixel is located at the same coordinates as the corresponding centroid in the received image.

At step 335, an RGB encoder adjusts the color of each pixel to represent the dimensions of a corresponding rectangle. For example, the RGB channels of each pixel may be modified to indicate a height, a width, and a ratio of the height to width of the corresponding rectangle, respectively. An RGB encoder may also adjust an alpha channel of one or more pixels to make such pixels transparent. For example, a low alpha value may be assigned to a pixel that corresponds to a feature that does not contribute to generating a fingerprint that accurately identifies the form being evaluated. Features that do not contribute to the generated fingerprint include a dust particle on the image of a form or a border around a form. The second image, which contains the encoded pixels, represents a digital fingerprint of the form depicted in the received image.

At step 340, an image normalizing component reduces the second image (i.e., the fingerprint) to a predetermined size. The digital fingerprint can be stored in a form database or compared to other fingerprints in a form database. Reducing the size of the fingerprint reduces the time needed to compare the fingerprint to other fingerprints in a form database.

Figure 4:
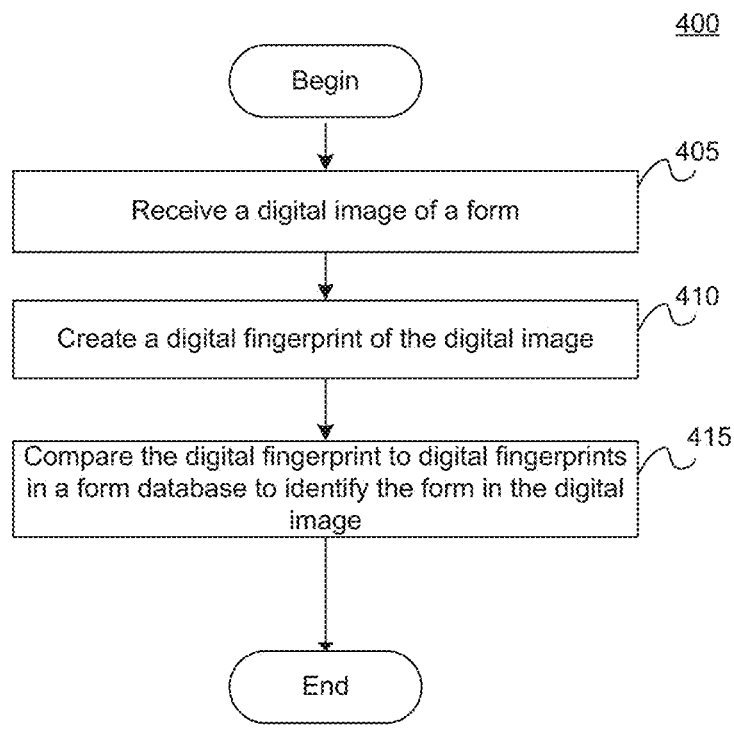
FIG. 4 illustrates a method for identifying a form using a digital fingerprint, according to one embodiment.

FIG. 4 illustrates a method 400 for identifying a form using a digital fingerprint, according to one embodiment. As shown, method 400 begins at step 405 where a digital fingerprint generator receives a digital image of a form. An individual may send or upload the digital image to a server configured to create a digital fingerprint of a form. For example, an individual may take an image of a form using a mobile device and upload the image to a server for commercially available tax preparation software. At step 410, a digital fingerprint is generated as discussed with reference to FIG. 3.

At step 415, to identify a version of a form corresponding to the generated fingerprint, a feature analysis component compares the generated fingerprint to other fingerprints stored in a form database. For example, a form database may contain digital fingerprints for various forms, where the layout of and data in each form are different. Each form in the database may also vary by an agency that created the form, a State that issued the form, and/or a year the form was issued.

The feature analysis component may use computer-vision feature-detection methods to detect features of the generated fingerprint and features of a given fingerprint in the database. The features detected in the two forms are analyzed and a distance between the two fingerprints is determined. The distance between the two forms may be determined using a Hamming distance or a Euclidean distance. To determine whether the fingerprints match, the distance between the fingerprints is compared to a predetermined distance measure threshold. If the distance is the minimum distance measure that satisfies the distance measure threshold, the two fingerprints match and the form corresponding to the generated fingerprint can be recognized as an instance of the form corresponding to the matching fingerprint in the database. For example, if the matching fingerprint in the database corresponds to a W-2 tax form issued by the IRS for 2014, the form in the received image that corresponds to the generated fingerprint is the same W-2 tax form issued by the IRS for 2014. Thus, attributes of the form in the digital image can be modified to indicate that the form was issued by the IRS for the 2014 tax year.

Figure 5:
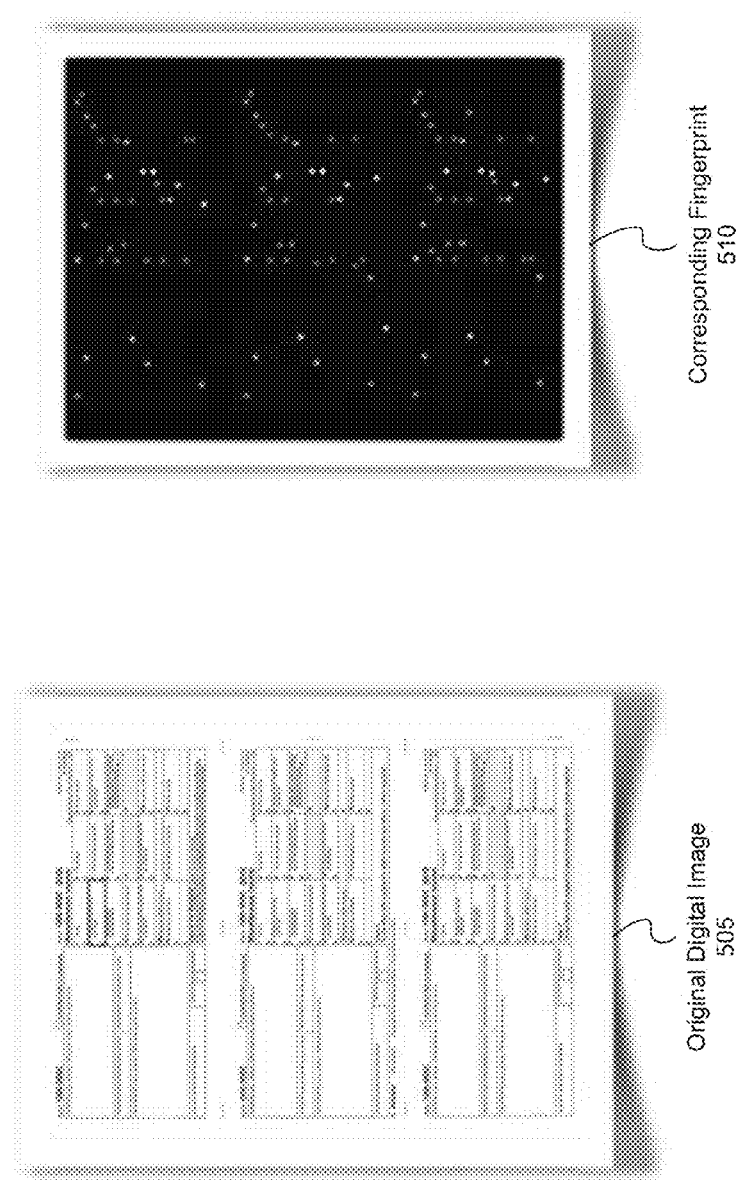
FIG. 5 illustrates an image of example forms and corresponding digital fingerprints, according to one embodiment.

FIG. 5 illustrates an original digital image 505 of example forms and corresponding digital fingerprints 510, according to one embodiment. As shown, the original digital image 505 of example forms contains three separate forms. An image processing component may process the image received from a client device. For example, the image processing component may de-skew the image, remove any keystoning, reduce the resolution of the image, perform color correction, perform binarization, etc.

A segmentation component may locate text and other features (i.e., groups of pixels) in the image using computer-vision feature-detection methods. For example, the image may be segmented into regions where each region corresponds to a feature in the image. A rectangular boundary is generated around each feature by blurring and eroding the feature. Dimensions of each rectangle are determined using diagonally opposite corners of the rectangles and are used to calculate a centroid of each rectangle. A centroid plotting component may create a second image that is blank and plot a pixel for each centroid in the second image. Dimensions of the second image may be the same as the dimensions of the received image after it is processed. An RGB encoder may modify a red, green, and blue channel of each pixel to represent the dimensions of the corresponding rectangle. For example, the red channel may be modified to represent a height of the corresponding rectangle, the green channel may be modified to represent a width of the corresponding rectangle, and the blue channel may be modified to represent a ratio of the height to the width of the corresponding rectangle. The RGB encoder may also assign a value to an alpha channel of one or more pixels. The alpha channel, which represents a level of transparency of a pixel, may be used to identify features of a form that do not contribute to generating a unique digital fingerprint of that form. For example, a dust particle on the image of a form and a border around a form may not contribute to generating a unique form because such features do not represent data that would be extracted from the form.

Once each pixel is plotted and the RGB channels are encoded, the blank image (with the encoded pixels) is the digital fingerprint of a corresponding form. The digital fingerprint represents the spatial relationship, size and importance of each image feature.

Figure 6:
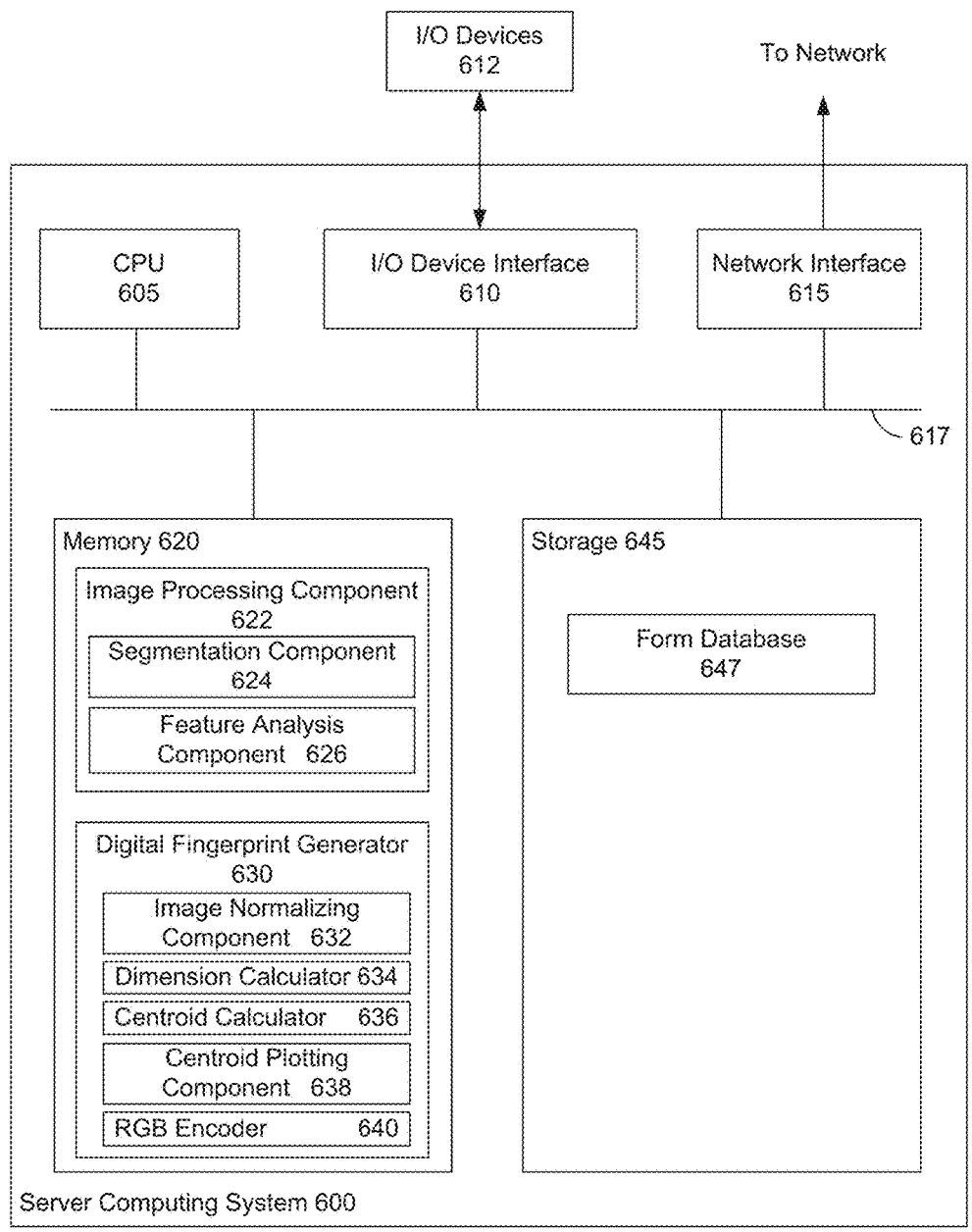
FIG. 6 illustrates an example computing system configured to identify a tax form using a digital fingerprint, according to one embodiment.

FIG. 6 illustrates an example computing system 600 configured to identify a tax form using a digital fingerprint, according to one embodiment. As shown, the computing system 600 includes, without limitation, a central processing unit (CPU) 605, a network interface 615, a memory 620, and storage 645, each connected to a bus 617. The computing system 600 may also include an I/O device interface 610 connecting I/O devices 612 (e.g., keyboard, display, mouse devices, image capture devices, etc.) to the computing system 600. Further, the computing elements shown in computing system 600 may correspond to a physical computing system (e.g., a system in a data center) or may be a virtual computing instance executing within a computing cloud.

The CPU 605 retrieves and executes programming instructions stored in the memory 620 as well as stored in the storage 645. The bus 617 is used to transmit programming instructions and application data between the CPU 605, I/O device interface 610, storage 645, network interface 615, and memory 620. Note, CPU 605 is included to be representative of a single CPU, multiple CPUs, a single CPU having multiple processing cores, and the like, and the memory 620 is generally included to be representative of a random access memory. The storage 645 may be a disk drive or flash storage device. Although shown as a single unit, the storage 645 may be a combination of fixed and/or removable storage devices, such as fixed disc drives, removable memory cards, optical storage, network attached storage (NAS), or a storage area-network (SAN).

Illustratively, the memory 620 includes an image processing component 622 including segmentation component 624 and feature analysis component 626, and a digital fingerprint generator 630 including image normalizing component 632, dimension calculator 634, centroid calculator 636, centroid plotting component 638, and RGB encoder 640. In certain aspects, these components may correspond to the components of the server computer 120 described with reference to FIG. 2.

For example, image normalizing component 632 may reduce a resolution of a received digital image of a form. Segmentation component 624 locates features in the image and segments the image into regions corresponding to each feature. Segmentation component 624 also generates a rectangular boundary around each feature. Dimension calculator 634 determines a height and a width of each rectangle. Centroid calculator 636 uses the height and width to determine a centroid of each rectangle. Centroid plotting component 638 creates a blank image and plots a pixel for each calculated centroid on the blank image.

Each pixel may be located on the blank image at the same coordinates as coordinates of a corresponding centroid in the received image. RGB encoder 640 modifies the red, green, and blue color channels of each pixel to represent the height, width, and ratio of the height and width of the corresponding rectangle. The blank image with the encoded pixels is the digital fingerprint of the form in the received image. Feature analysis component 626 compares the digital fingerprint of the form in the received image to fingerprints stored in form database 647.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for generating a digital fingerprint corresponding to a form depicted in a digital image, the method comprising:
   identifying one or more features of a form depicted in a first digital image;
   determining, for each of the one or more features, coordinates of a respective polygon bounding the feature within the first digital image; and
   for each polygon:
      identifying coordinates of a center of the polygon within the first digital image, and
      storing dimensions of the polygon in one or more color channels of a pixel in a second image, wherein a position of the pixel in the second image matches a position of the center of the polygon in the first digital image and wherein the second image comprises a digital fingerprint of the form depicted in the first digital image.

2. The method of claim 1, further comprising:
comparing the second image to a plurality of images, each image representing a digital fingerprint of a corresponding form;
determining, based on the comparison, a distance measure between the second image and each of the plurality of images;
identifying a matching image, of the plurality of images, wherein the matching image has a minimum distance measure determined between the second image and each of the plurality of images and wherein the minimum distance measure satisfies a distance measure threshold; and
recognizing the form depicted in the first digital image as an instance of a form corresponding to the matching image.

3. The method of claim 1, further comprising:
reducing the second image to a predetermined size.

4. The method of claim 1, further comprising:
prior to identifying the coordinates of the center of at least a first polygon, discarding the first polygon after determining that either (i) the first polygon has a ratio of a height to a width that does not satisfy a minimum threshold or (ii) the first polygon has a dimension that does not meet a minimum size.

5. The method of claim 1, further comprising:
encoding a value in an alpha channel of one or more pixels in the second image, wherein the value represents a level of importance of a polygon corresponding to each of the one or more pixels to the digital fingerprint of the form.

6. The method of claim 1, wherein storing dimensions of the polygon in one or more color channels of a pixel in a second image comprises:
a first color channel which stores a height of a corresponding polygon,
a second color channel which stores a width of the corresponding polygon, and
a third color channel which stores a ratio of the height of the corresponding polygon to the width of the corresponding polygon.

7. The method of claim 1, further comprising:
normalizing image characteristics of the first digital image.

8. A non-transitory computer-readable storage medium storing instructions, which, when executed on a processor, perform an operation to generate a digital fingerprint corresponding to a form depicted in a digital image, the operation comprising:
identifying one or more features of a form depicted in a first digital image;
determining, for each of the one or more features, coordinates of a respective polygon bounding the feature within the first digital image; and
for each polygon:
identifying coordinates of a center of the polygon within the first digital image, and
storing dimensions of the polygon in one or more color channels of a pixel in a second image, wherein a position of the pixel in the second image matches a position of the center of the polygon in the first digital image and wherein the second image comprises a digital fingerprint of the form depicted in the first digital image.

9. The non-transitory computer-readable storage medium of claim 8, further comprising:
comparing the second image to a plurality of images, each image representing a digital fingerprint of a corresponding form;
determining, based on the comparison, a distance measure between the second image and each of the plurality of images;
identifying a matching image, of the plurality of images, wherein the matching image has a minimum distance measure determined between the second image and each of the plurality of images and wherein the minimum distance measure satisfies a distance measure threshold; and
recognizing the form depicted in the first digital image as an instance of a form corresponding to the matching image.

10. The non-transitory computer-readable storage medium of claim 8, further comprising:
reducing the second image to a predetermined size.

11. The non-transitory computer-readable storage medium of claim 8, further comprising:
prior to identifying the coordinates of the center of at least a first polygon, discarding the first polygon after determining that either (i) the first polygon has a ratio of a height to a width that does not satisfy a minimum threshold or (ii) the first polygon has a dimension that does not meet a minimum size.

12. The non-transitory computer-readable storage medium of claim 8, further comprising:
encoding a value in an alpha channel of one or more pixels in the second image, wherein the value represents a level of importance of a polygon corresponding to each of the one or more pixels to the digital fingerprint of the form.

13. The non-transitory computer-readable storage medium of claim 8, wherein storing dimensions of the polygon in one or more color channels of a pixel in a second image comprises:
a first color channel which stores a height of a corresponding polygon,
a second color channel which stores a width of the corresponding polygon, and
a third color channel which stores a ratio of the height of the corresponding polygon to the width of the corresponding polygon.

14. The non-transitory computer-readable storage medium of claim 8, further comprising:
normalizing image characteristics of the first digital image.

15. A system, comprising:
a processor; and
a memory hosting an application, which, when executed on the processor, performs an operation to generate a digital fingerprint corresponding to a form depicted in a digital image, the operation comprising:
identifying one or more features of a form depicted in a first digital image;
determining, for each of the one or more features, coordinates of a respective polygon bounding the feature within the first digital image; and
for each polygon:
identifying coordinates of a center of the polygon within the first digital image, and storing dimensions of the polygon in one or more color channels of a pixel in a second image, wherein a position of the pixel in the second image matches a position of the center of the polygon in the first digital image and wherein the second image comprises a digital fingerprint of the form depicted in the first digital image.

16. The system of claim 15, further comprising:

comparing the second image to a plurality of images, each image representing a digital fingerprint of a corresponding form;

determining, based on the comparison, a distance measure between the second image and each of the plurality of images;

identifying a matching image, of the plurality of images, wherein the matching image has a minimum distance measure determined between the second image and each of the plurality of images and wherein the minimum distance measure satisfies a distance measure threshold; and recognizing the form depicted in the first digital image as an instance of a form corresponding to the matching image.

17. The system of claim 15, further comprising:

prior to identifying the coordinates of the center of at least a first polygon, discarding the first polygon after determining that either (i) the first polygon has a ratio of a height to a width that does not satisfy a minimum threshold or (ii) the first polygon has a dimension that does not meet a minimum size.

18. The system of claim 15, further comprising:

encoding a value in an alpha channel of one or more pixels in the second image, wherein the value represents a level of importance of a polygon corresponding to each of the one or more pixels to the digital fingerprint of the form.

19. The system of claim 15, wherein storing dimensions of the polygon in one or more color channels of a pixel in a second image comprises:

a first color channel which stores a height of a corresponding polygon, a second color channel which stores a width of the corresponding polygon, and a third color channel which stores a ratio of the height of the corresponding polygon to the width of the corresponding polygon.

20. The system of claim 15, further comprising:

normalizing image characteristics of the first digital image.

* * * * *